United States Patent
Huang

(12) United States Patent (10) Patent No.: US 7,237,349 B2
Huang (45) Date of Patent: Jul. 3, 2007

(54) DISPLAY SUSPENDING FRAME

(76) Inventor: Ming-Hua Huang, 235 Chung-Ho Box 8-24, Taipei (TW)

(*) Notice: Subject to any disclaimer, the term of this patent is extended or adjusted under 35 U.S.C. 154(b) by 46 days.

(21) Appl. No.: 11/207,961

(22) Filed: Aug. 22, 2005

(65) Prior Publication Data

US 2007/0039221 A1 Feb. 22, 2007

(51) Int. Cl.
G09F 15/00 (2006.01)
G09F 7/00 (2006.01)
E04G 3/00 (2006.01)
A47G 1/16 (2006.01)

(52) U.S. Cl. .............. 40/606.14; 248/284.1; 248/475.1; 40/611.01

(58) Field of Classification Search .......... 40/759, 40/757, 606.14, 611.01; 248/489, 343, 466, 248/495, 284, 1, 470, 475, 477, 917
See application file for complete search history.

(56) References Cited

U.S. PATENT DOCUMENTS

D530,595 S * 10/2006 Lam et al. ............... D8/373
2002/0033436 A1 * 3/2002 Peng et al. .............. 248/284.1
2002/0179791 A1 * 12/2002 Kwon .................... 248/284.1

* cited by examiner

Primary Examiner—Robert J. Sandy
Assistant Examiner—Syed A Islam

(57) ABSTRACT

A display suspending frame is disclosed. The first frame is locked to the wall by two supporting frames. A second frame can be locked to the backside of the display by the second two supporting frames. An upper transversal rod and the lower transversal rod passing through the two supporting frame of the first frame run across the two supporting frames of the second frame. Then, a latch passes through the penetrating hole of a left linkage of the first frame and trenches of the two supporting frames of the first frame and the recesses of the two supporting frames of the second frame. When the latch passes through the two linkages, the latch will fall into lower sides of the trenches of the two supporting frames of the first frame so that the two ends of the latch are confined by the linkages without moving transversally.

2 Claims, 10 Drawing Sheets

DISPLAY SUSPENDING FRAME

FIELD OF THE INVENTION

The present invention relates to displays, and in particular to a display suspending frame, wherein the displays, such as liquid crystal displays or plasma displays, are stably installed to a wall. Furthermore, the display suspending frame of the present invention is suitable for displays of various sizes.

BACKGROUND OF THE INVENTION

Since the liquid crystal displays and plasma display are made thinner and thinner for occupying less space, they are often suspended to walls. One prior art display suspending frame (referring to FIG. 1) is formed by a retaining seat 10 capable of being retained to a wall 30 and a suspending seat 20 capable of being fixed to a display 40.

The retaining seat 10 (referring to FIGS. 2 and 3) is a rectangular seat by punching a metal. A periphery thereof is formed with a frame 11 which can be flatly adhered to a wall 30. An edge of the frame 11 is formed with a plurality of holes 12 for passing studs to lock to the wall 30 so as to fix the retaining seat 10 to the wall 30. A center of the retaining seat 10 is pushed forwards as a plane. Two sides of the plane are formed with respective suspending holes 13. The holes at upper sides are larger than those at lower sides.

The suspending post 23 (referring to FIGS. 2 and 3) is a rectangular seat by punching a metal. A periphery thereof has a frame 21 which can be flatly adhered upon the backside of a display 40. The frame 21 has a plurality of holes 22. Studs pass through the holes so as to be locked to the display 40. Thereby the suspending seat 20 can be retained to the display 40. A center of the suspending seat 20 is punched with a rear convex plane. Two sides of the plane are installed with rear convex suspending posts 23. A rear end of each suspending post 23 is formed with a larger head 24. The suspending post 23 is corresponding to the suspending hole 13 of the retaining seat 10.

By above mentioned structure, in use of the prior art display, the studs serve to fix the retaining seat 10 upon the wall 30. Studs serve to fix the suspending seat 20 to the display 40. Then the suspending posts 23 on the suspending seat 20 pass through the suspending holes 13 having larger sizes. Then the suspending posts 23 move downwards to the holes 13 having smaller sizes so that the suspending posts 23 are engaged to the holes 13 by the larger heads 24 at the rear end thereof. Thereby the display 40 can be suspended to the wall 30.

However due to the improvement of technology, displays of different sizes are developed and are widely used in daily life (such as plasma TVs or liquid crystal TVS). In the prior art, only the heads 24 of the suspending posts 23 of the suspending seat 20 and the holes 13 of the retaining seat 10 are used in fixing. The suspending posts 23 are formed on the retaining seat 10 directly, which have low tolerance in bearing an object. If the size of the display is great, it is easily destroyed or the display falls down. Furthermore, the size of the prior art display suspending frame has a fix type. It is unchangeable with the sizes of the displays. Thus, it is not suitable for displays of various sizes.

SUMMARY OF THE INVENTION

Accordingly, the primary object of the present invention is to provide a display suspending frame, wherein the displays, such as liquid crystal displays or plasma displays, are stably installed to a wall. Furthermore, the display suspending frame is suitable for displays of various sizes.

To achieve above object, the present invention provides a display suspending frame comprising: a first frame capable of being fixed to a wall; the first frame having a first left supporting frame and a first right supporting frame which are locked to a wall by screws; each of the first left supporting frame and first right supporting frame having a U shape; each of two opposite sides of each of the first left supporting frame and first right supporting frame having a trench; a lower transversal rod passing through lower sides of the first left supporting frame and first right supporting frame; an upper transversal rod above the lower transversal rod pass through the upper sides of the first left supporting frame and the first right supporting frame; the first right supporting frame and first left supporting frame being moveable transversally along the upper transversal rod and lower transversal rod; a right linkage connects left sides of the upper transversal rod and lower transversal rod; a left linkage connecting the right sides of the upper transversal rod and the lower transversal rod; the right linkage having a penetrating hole corresponding to the trenches of the first left supporting frame and the first right supporting frame; a second frame being capable of being fixed to a backside of the display; the second frame having a second left supporting frame and a first second right supporting frame which are locked a backside of a display; each of the second left supporting frame and first second right supporting frame having a U shape; an approximate middle section of two opposite sides of each of the second left supporting frame and first second right supporting frame having a longitudinal recess; an upper side of each of the second left supporting frame and the first second right supporting frame being formed with an upper hanging slot and a lower side of each of first left supporting frame and first right supporting frame being formed with a lower hanging slot; the upper hanging slots and the lower hanging slots being corresponding to the upper transversal rod and lower transversal rod of the first left supporting frame and the first right supporting frame; and a latch having a length slightly smaller than that of the upper transversal rod and lower transversal rod of the first frame; the latch can pass through the penetrating holes of left linkage, the trenches of the first left supporting frame and the first right supporting frame of the first frame and the recesses of the second left supporting frame and the first second right supporting frame of the second frame.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 4 to 8, the present invention includes the following element.

Figure 1:
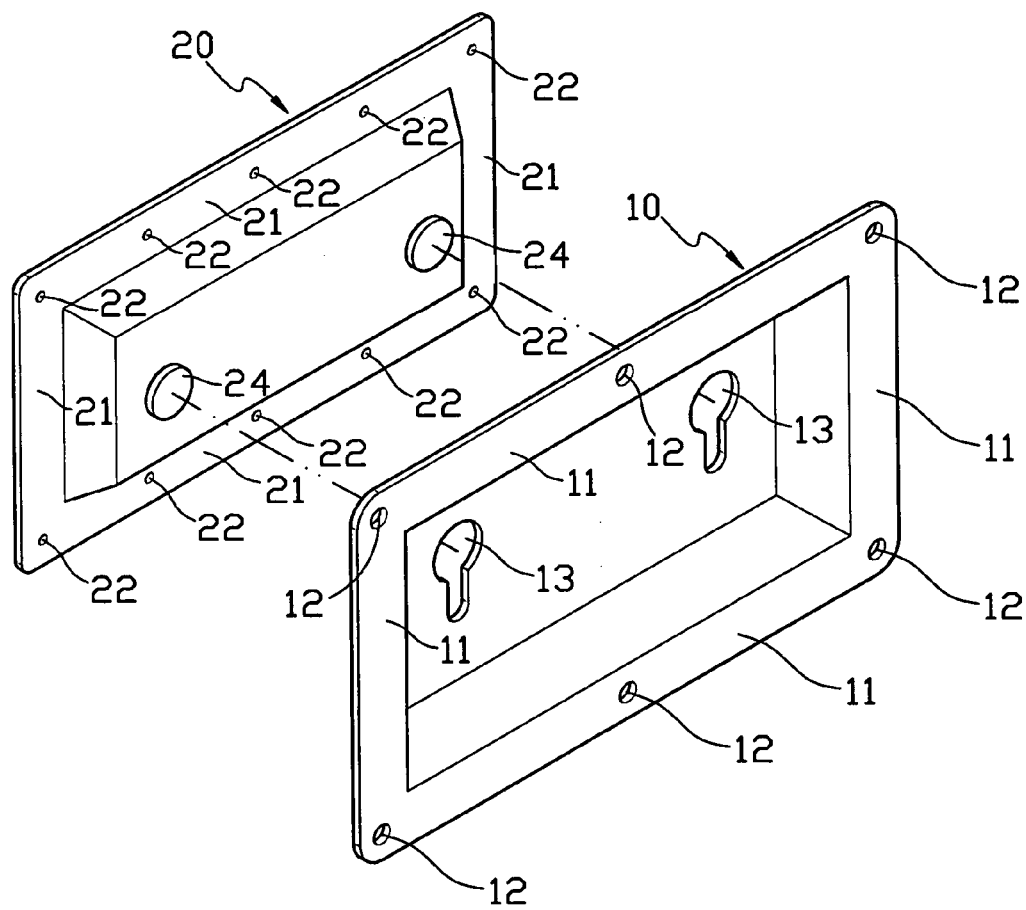
FIG. 1 is an exploded perspective view of the prior art display suspending frame.
Figure 2:
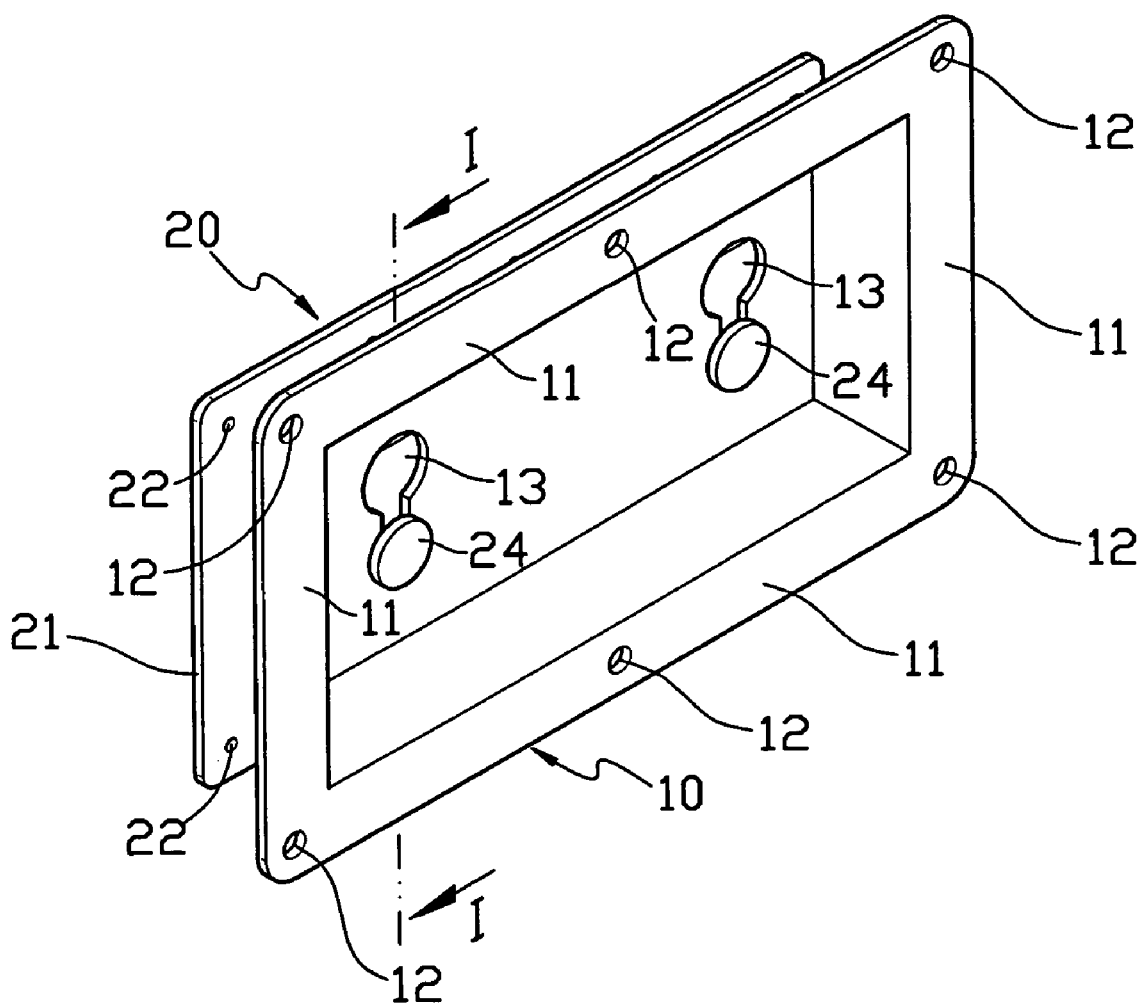
FIG. 2 is an assembled perspective view of the display suspending frame of the present invention.
Figure 3:
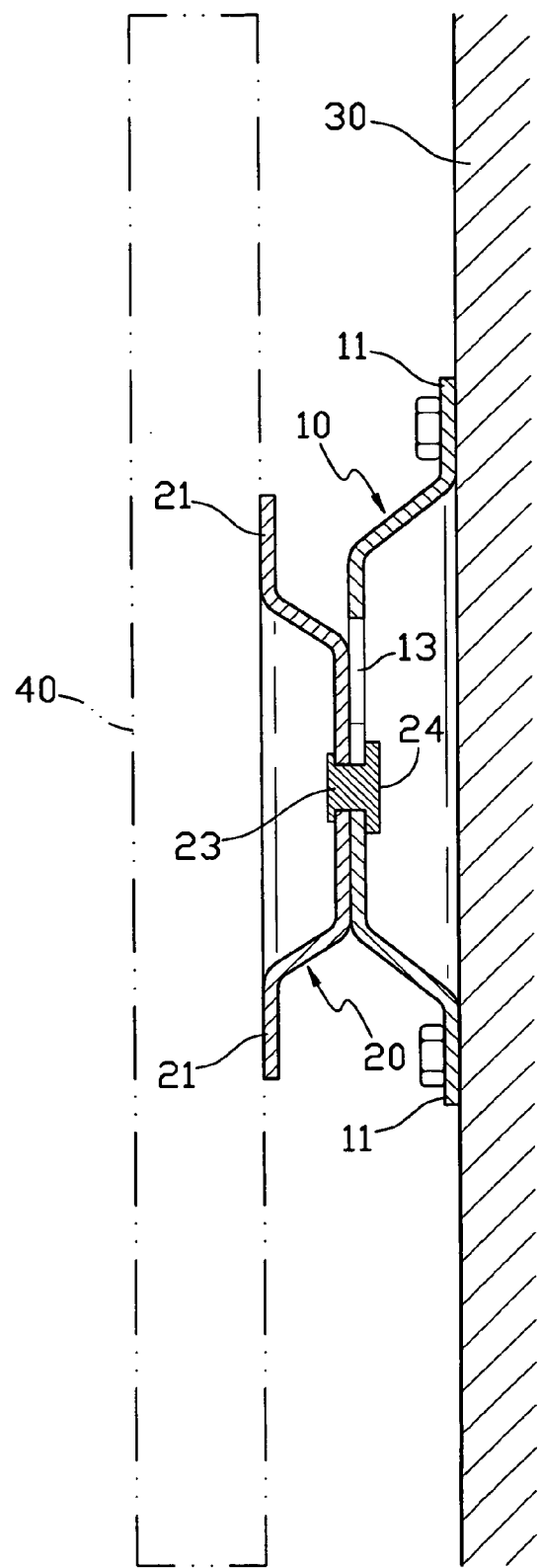
FIG. 3 is a cross sectional view along line I—I of FIG. 2.
Figure 4:
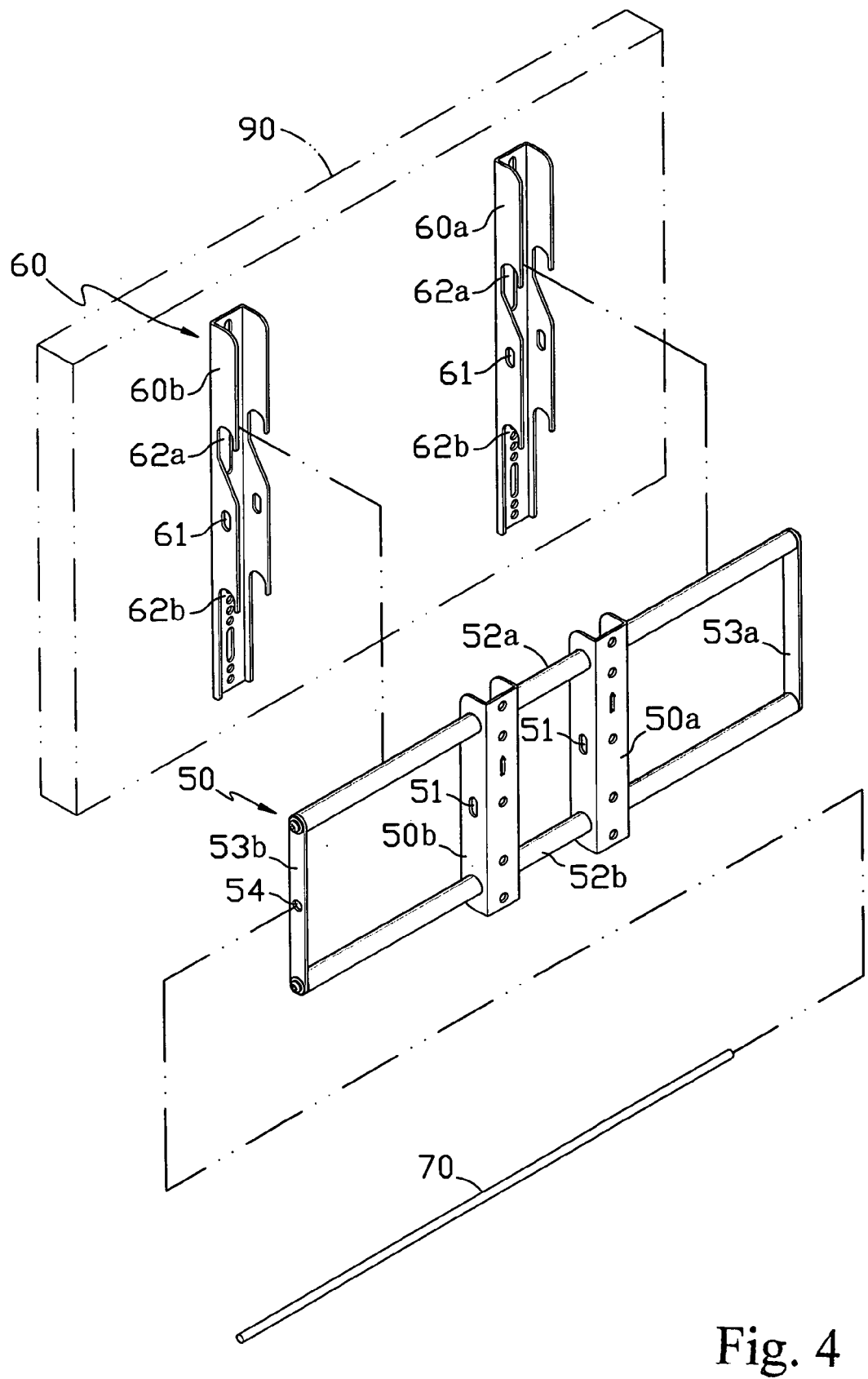
FIG. 4 is an exploded perspective view of the present invention.
Figure 5:
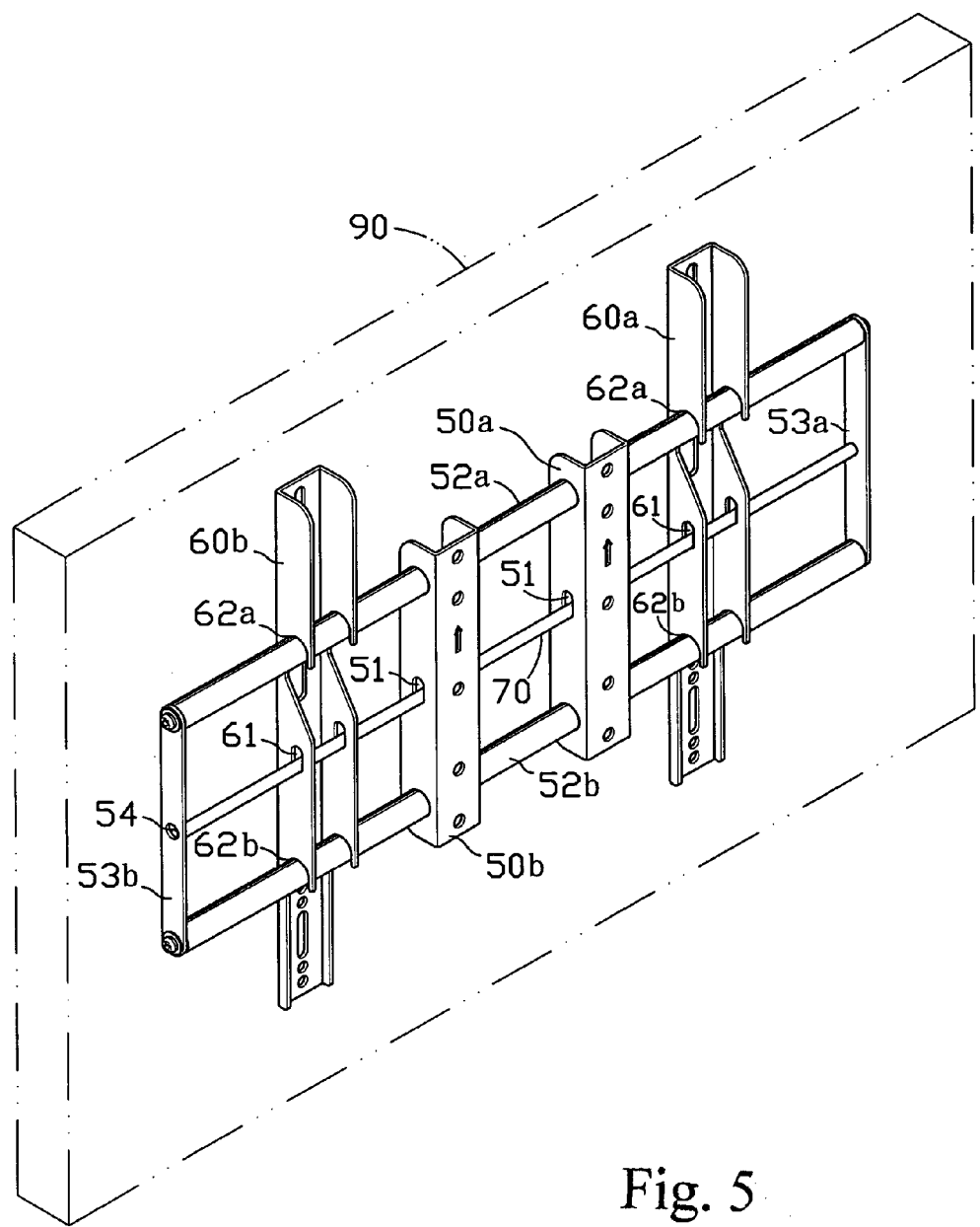
FIG. 5 is an assembled perspective view the present invention.
Figure 6:
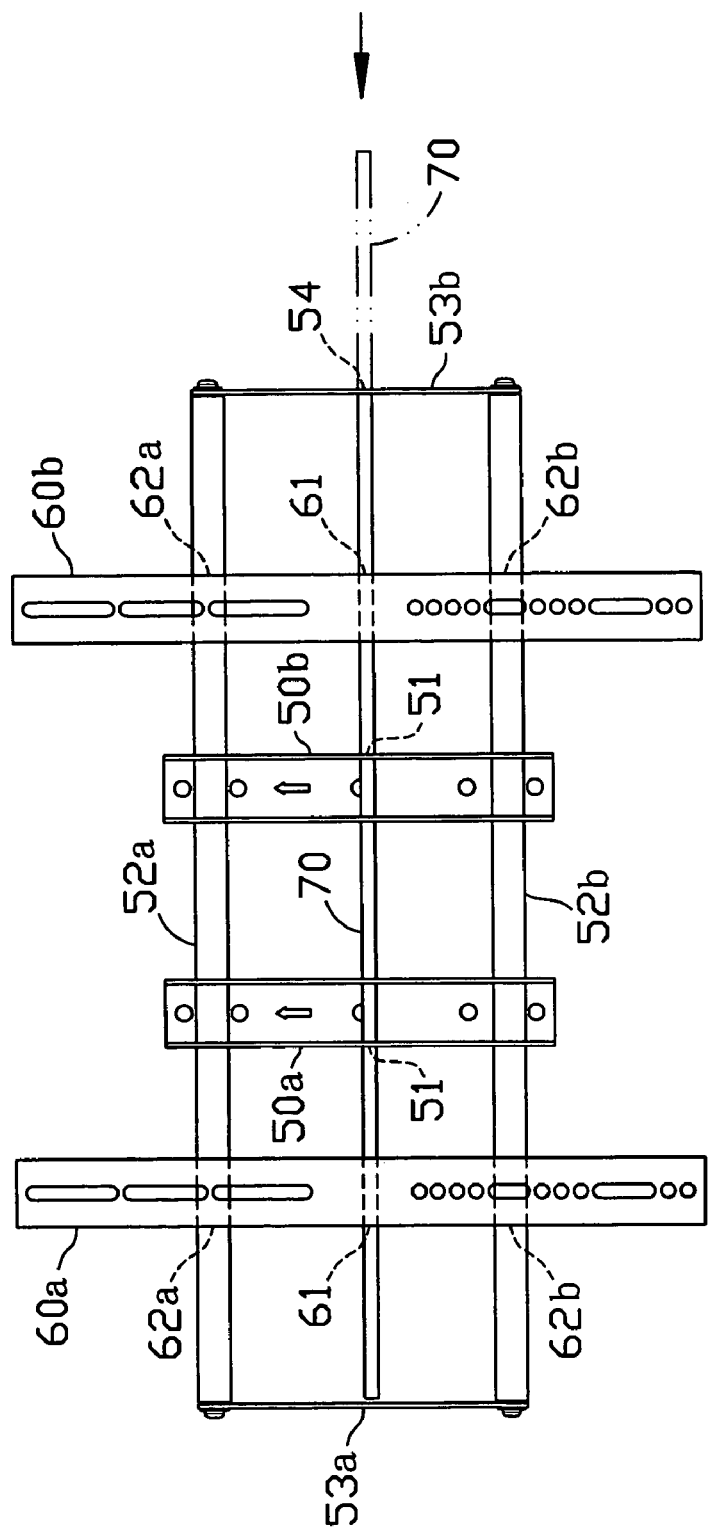
FIG. 6 is an assembled front view of the present invention showing the operation of the present invention.
Figure 7:
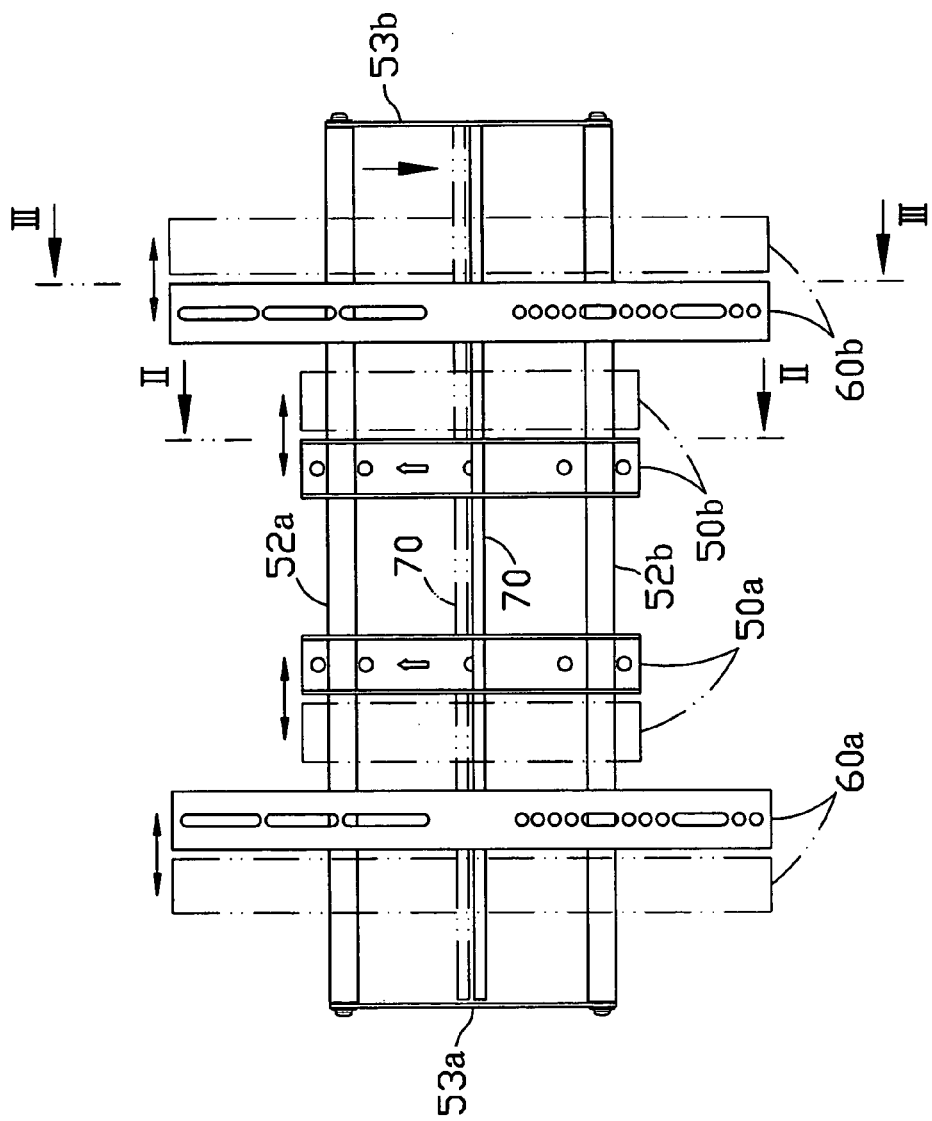
FIG. 7 is a further assembled front view showing another operation of the present invention.

A first frame 50 is capable of being fixed to a wall 80 (referring to FIGS. 5 and 6). The first frame 50 has a first left supporting frame 50*a* and a first right supporting frame 50*b* which are locked to a wall 80 by screws (referring to FIG. 8). Each of the first left supporting frame 50*a* and first right supporting frame 50*b* has a U shape. Each of two opposite sides of each of the first left supporting frame 50*a* and first right supporting frame 50*b* has a trench 51. A lower transversal rod 52*b* passes through lower sides of the first left supporting frame 50*a* and first right supporting frame 50*b*. An upper transversal rod 52*a* above the lower transversal rod 52*b* pass through the upper sides of the first left supporting frame 50*a* and the first right supporting frame 50*b*. The first right supporting frame 50*b* and first left supporting frame 50*a* are moveable transversally along the upper transversal rod 52*a* and lower transversal rod 52*b* (referring to FIG. 7). A right linkage 53*b* connects left sides of the upper transversal rod 52*a* and lower transversal rod 52*b*. A left linkage 53*a* connects the right sides of the upper transversal rod 52*a* and lower transversal rod 52*b*. The right linkage 53*b* has a penetrating hole 54 corresponding to the trenches 51 of the first left supporting frame 50*a* and the first right supporting frame 50*b*.

Figure 9:
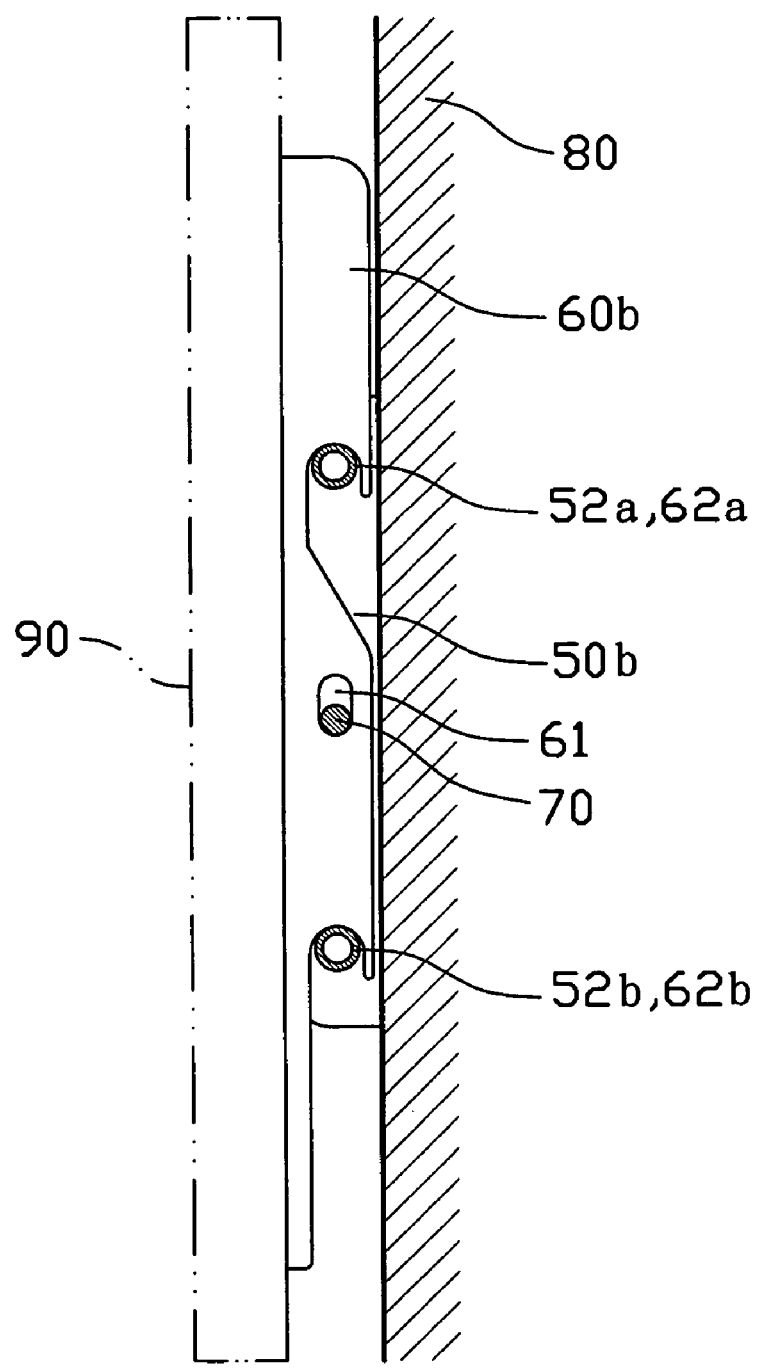
FIG. 9 is a cross sectional view along line III—III of FIG. 7.

A second frame 60 is capable of being fixed to a back of the display 90 (referring to FIGS. 5 and 6). The second frame 60 has a second left supporting frame 60*a* and a first second right supporting frame 60*b* which are locked a backside of a display 90 (referring to FIG. 9). Each of the second left supporting frame 60*a* and first second right supporting frame 60*b* has a U shape. An approximate middle section of two opposite sides of each of the second left supporting frame 60*a* and first second right supporting frame 60*b* has a longitudinal recess 61. An upper side of each of the second left supporting frame 60*a* and the first second right supporting frame 60*b* is formed with an upper hanging slots 62*a* and a lower side of each of first left supporting frame 50*a* and first right supporting frame 50*b* is formed with a lower hanging slot 62*b*. The upper hanging slots 62*a* and the lower hanging slots 62*b* are corresponding to the upper transversal rod 52*a* and lower transversal rod 52*b* of the first left supporting frame 50*a* and the first right supporting frame 50*b*.

A latch 70 (referring to FIGS. 5 and 6) has a length slightly smaller than that of the upper transversal rod 52*a* and lower transversal rod 52*b* of the first frame 50. The latch 70 can pass through the penetrating holes 54 of left linkage 53*a*, the trenches 51 of the first left supporting frame 50*a* and the first right supporting frame 50*b* of the first frame 50 and the recesses 61 of the second left supporting frame 60*a* and the first second right supporting frame 60*b* of the second frame 60.

Figure 8:
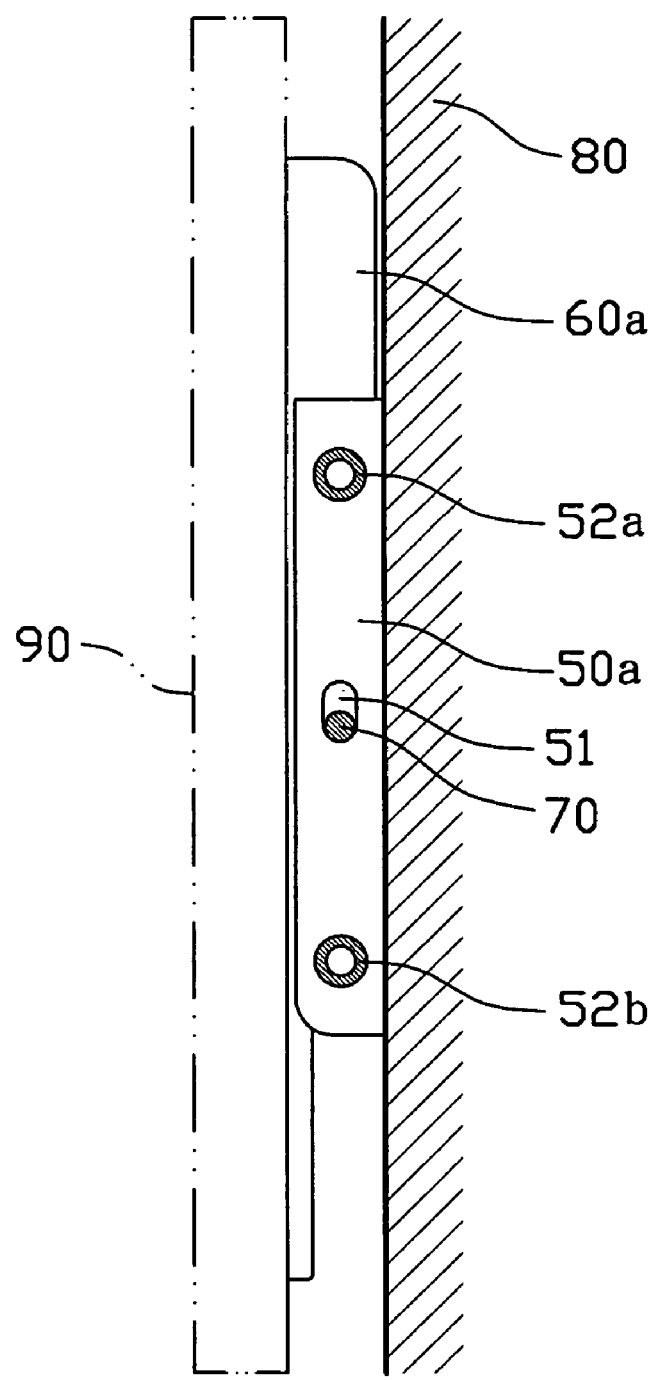
FIG. 8 is a cross sectional view along line II—II of FIG. 7.
Figure 10:
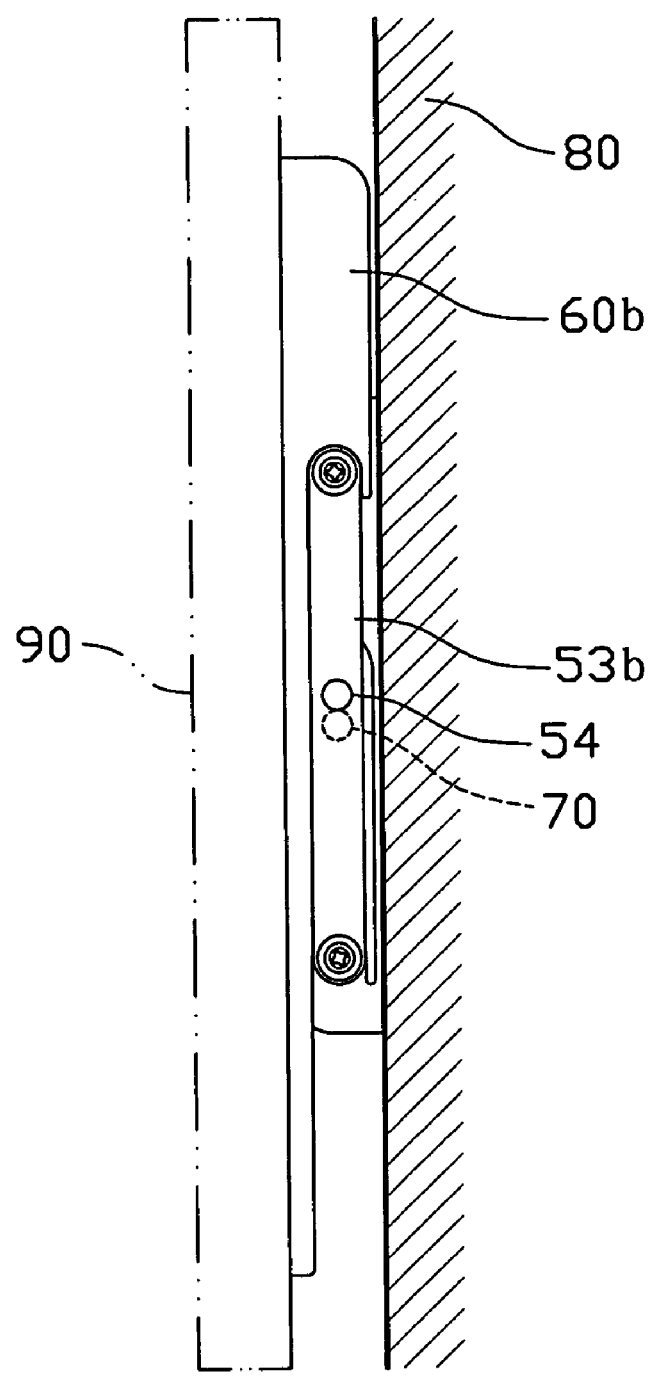
FIG. 10 is a lateral view of the present invention.

By above mentioned design, the first frame 50 is locked to the wall 80 by the first left supporting frame 50*a* and the first right supporting frame 50*b* (referring to FIG. 8). The second frame 60 can be locked to the backside of the display 90 by the second left supporting frame 60*a* and the first second right supporting frame 60*b* (referring to FIGS. 5 and 9). Next, the upper transversal rod 52*a* and the lower transversal rod 52*b* of the first left supporting frame 50*a* and the first right supporting frame 50*b* of the first frame 50 run across the upper hanging slot 62*a* and the lower hanging slot 62*b* of the second left supporting frame 60*a* and first second right supporting frame 60*b* of the second frame 60 (referring to FIGS. 5 and 6). Then, the latch 70 passes through the penetrating hole 54 of the left linkage 53*a* of the first frame 50 and the trenches 51 of the first left supporting frame 50*a* and the first right supporting frame 50*b* of the first frame 50 and the recesses 61 of the second left supporting frame 60*a* and the first second right supporting frame 60*b* of the second frame 60 (referring to FIG. 6). Next, when the latch 70 passes through the two linkages 53*a*, 53*b*, the latch 70 will fall into lower sides of the trenches 51 of the first left supporting frame 50*a* and the first right supporting frame 50*b* of the first frame 50 (referring to FIGS. 5 and 7) so that the two ends of the latch 70 are confined by the left linkage 53*a* and right linkage 53*b* without moving transversally (referring to FIGS. 5 and 10). Thereby by the latch 70, the second frame 60 can be suspended from the first frame 50 so as to suspend the display 90 steadily on the wall 80.

However in the present invention, since the first left supporting frame 50*a* and first right supporting frame 50*b* of the first frame 50 are movable along the upper transversal rod 52*a* and lower transversal rod 52*b* for adjusting the distance (referring to FIG. 7), the present invention is adjustable with the size of the display. Thus, various displays are suitable to the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A display suspending frame comprising:
a first frame capable of being fixed to a wall; the first frame having a first left supporting frame and a first right supporting frame which are locked to the wall by screws; each of the first left supporting frame and first right supporting frame having a U shape; each of two opposite sides of each of the first left supporting frame and first right supporting frame having a trench; a lower transversal rod passing through lower sides of the first left supporting frame and first right supporting frame; an upper transversal rod above the lower transversal rod passing through the upper sides of the first left supporting frame and the first right supporting frame; the first right supporting frame and the first left supporting frame being moveable transversally along the upper transversal rod and the lower transversal rod; a right linkage connecting left sides of the upper transversal rod and the lower transversal rod; a left linkage connecting the right sides of the upper transversal rod and the lower transversal rod; the right linkage having a penetrating hole corresponding to the trenches of the first left supporting frame and the first right supporting frame;

a second frame being capable of being fixed to a backside of a display; the second frame having a second left supporting frame and a first second right supporting frame which are locked to a backside of a display; each of the second left supporting frame and first second right supporting frame having a U shape; an approximate middle section of two opposite sides of each of the second left supporting frame and the first second right supporting frame having a longitudinal recess; an upper side of each of the second left supporting frame and the first second right supporting frame being formed with an upper hanging slot and a lower side of each of first left supporting frame and first right supporting frame being formed with a lower hanging slot; the upper hanging slots and the lower hanging slots being corresponding to the upper transversal rod and the lower transversal rod of the first left supporting frame and the first right supporting frame; and a latch having a length slightly smaller than that of the upper transversal rod and lower transversal rod of the first frame; the latch passing through the penetrating holes of left linkage, the trenches of the first left supporting frame and the first right supporting frame of the first frame and the recesses of the second left supporting frame and the second right supporting frame of the second frame.

2. The display suspending frame as claimed in claim 1, wherein the first left supporting frame and the first right supporting frame of the first frame are movable along the upper transversal rod and the lower transversal rod for adjusting the distance between the first left supporting frame and first right supporting frame.

* * * * *